(12) United States Patent
Luo et al.

(10) Patent No.: US 10,790,497 B2
(45) Date of Patent: Sep. 29, 2020

(54) METHOD FOR MAKING LITHIUM ION BATTERY ANODE

(71) Applicants: Tsinghua University, Beijing (CN); HON HAI PRECISION INDUSTRY CO., LTD., New Taipei (TW)

(72) Inventors: Yu-Feng Luo, Beijing (CN); Jia-Ping Wang, Beijing (CN); Kai-Li Jiang, Beijing (CN); Shou-Shan Fan, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 15/913,873

(22) Filed: Mar. 6, 2018

(65) Prior Publication Data
US 2018/0287132 A1 Oct. 4, 2018

(30) Foreign Application Priority Data
Apr. 1, 2017 (CN) .......................... 2017 1 0214070

(51) Int. Cl.
*H01M 4/04* (2006.01)
*H01M 4/66* (2006.01)
(Continued)

(52) U.S. Cl.
CPC ........... *H01M 4/0471* (2013.01); *B82Y 30/00* (2013.01); *H01M 4/0416* (2013.01); *H01M 4/13* (2013.01);
(Continued)

(58) Field of Classification Search
None
See application file for complete search history.

(56) References Cited

U.S. PATENT DOCUMENTS

| 8,846,144 B1 * | 9/2014 | Wang | H01B 1/04 252/514 |
| 2002/0182503 A1 * | 12/2002 | Asari | C09C 1/56 429/231.1 |

(Continued)

FOREIGN PATENT DOCUMENTS

| CN | 1812180 | 8/2006 |
| CN | 101712452 B | 7/2012 |

(Continued)

OTHER PUBLICATIONS

Xiaoping Cheng et al., Three-Dimensional α-Fe2O3/Carbon Nanotube Sponges as Flexible Supercapacitor Electrodes Journal of Materials Chemistry A, Jul. 27, 2017, 20927-20934.

*Primary Examiner* — Jonathan Crepeau
*Assistant Examiner* — Angela J Martin
(74) *Attorney, Agent, or Firm* — ScienBiziP, P.C.

(57) ABSTRACT

A method for making lithium ion battery anode includes: scrapping a carbon nanotube array to obtain a carbon nanotube source, and adding the carbon nanotube source into water to form a carbon nanotube dispersion; providing a transition metal nitrate, adding the transition metal nitrate to the carbon nanotube dispersion to form a mixture of a carbon nanotube floccule and a transition metal nitrate solution; freeze-drying the mixture of the carbon nanotube floccule and the transition metal nitrate solution under vacuum condition to form a lithium ion batter anode preform; and, heat-treating the lithium ion battery anode preform to form the lithium ion battery anode.

14 Claims, 12 Drawing Sheets

(51) Int. Cl.
*H01M 4/13* (2010.01)
*H01M 4/62* (2006.01)
*H01M 10/0569* (2010.01)
*H01M 10/0585* (2010.01)
*H01M 10/0565* (2010.01)
*B82Y 30/00* (2011.01)
*H01M 4/131* (2010.01)
*H01M 4/70* (2006.01)
*H01M 4/1391* (2010.01)
*H01M 10/0525* (2010.01)
*H01M 4/02* (2006.01)
*B82Y 40/00* (2011.01)

(52) U.S. Cl.
CPC ......... *H01M 4/131* (2013.01); *H01M 4/1391* (2013.01); *H01M 4/625* (2013.01); *H01M 4/661* (2013.01); *H01M 4/663* (2013.01); *H01M 4/70* (2013.01); *H01M 10/0565* (2013.01); *H01M 10/0569* (2013.01); *H01M 10/0585* (2013.01); *B82Y 40/00* (2013.01); *H01M 10/0525* (2013.01); *H01M 2004/027* (2013.01); *H01M 2004/028* (2013.01)

(56) References Cited

U.S. PATENT DOCUMENTS

| | | |
|---|---|---|
| 2006/0194117 A1 | 8/2006 | Paulsen |
| 2010/0044647 A1* | 2/2010 | Meng ................... B82Y 30/00 252/511 |
| 2010/0051471 A1* | 3/2010 | Meng ................... B82Y 30/00 205/414 |
| 2014/0041210 A1 | 2/2014 | He et al. |
| 2014/0057178 A1 | 2/2014 | He et al. |
| 2016/0009558 A1 | 1/2016 | Luo et al. |

FOREIGN PATENT DOCUMENTS

| | | |
|---|---|---|
| CN | 103594681 | 2/2014 |
| CN | 105329873 | 2/2016 |
| TW | I478427 | 3/2015 |

* cited by examiner

METHOD FOR MAKING LITHIUM ION BATTERY ANODE

CROSS-REFERENCE TO RELATED APPLICATIONS

This application claims all benefits accruing under 35 U.S.C. § 119 from China Patent Application No. 201710214070.0, filed on Apr. 1, 2017, in the China Intellectual Property Office, the contents of which are hereby incorporated by reference.

FIELD

The present disclosure relates to a method for making lithium ion battery anode.

BACKGROUND

Compared with the traditional nickel-cadmium batteries, Lithium ion battery is a new type of green chemical power, which has the advantages of high voltage, long life, high energy density.

Lithium ion battery anode is an important part of lithium-ion battery. Currently more studied and more mature anode materials are carbon materials, such as graphite, acetylene black, carbon fiber, pyrolysis polymers and cracking carbon. However, with the development of technology, it is more and more difficult for the carbon anode to meet the increasing market demand for the high energy and high power density of lithium ion batteries. And, transition metal oxides have attracted wide attention in the lithium ion battery field. Transition metal oxides can have high theoretical specific capacity, and are environmentally friendly and naturally rich, as such, transition metal oxide anode is an ideal replacement for graphite anode.

However, there are still two main disadvantages hindering the practical application of the transition metal oxide anode. First, during the discharging and charging, a volume of the transition metal oxide anode expands, which cause damage to the lithium ion battery. Second, transition metal oxides have inherently lower conductivities, and lithium ion battery anode composed of transition metal oxides has low reacting activity.

BRIEF DESCRIPTION OF THE DRAWINGS

Implementations of the present technology will now be described, by way of example only, with reference to the attached figures, wherein.

DETAILED DESCRIPTION

The disclosure is illustrated by way of example and not by way of limitation in the figures of the accompanying drawings in which like references indicate similar elements. It should be noted that references to "another," "an," or "one" embodiment in this disclosure are not necessarily to the same embodiment, and such references mean "at least one."

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain parts have been exaggerated to illustrate details and features of the present disclosure better.

Several definitions that apply throughout this disclosure will now be presented.

The term "substantially" is defined to be essentially conforming to the particular dimension, shape, or other feature which is described, such that the component need not be exactly or strictly conforming to such a feature. The term "include," when utilized, means "include, but not necessarily limited to"; it specifically indicates open-ended inclusion or membership in the so-described combination, group, series, and the like.

Figure 1:
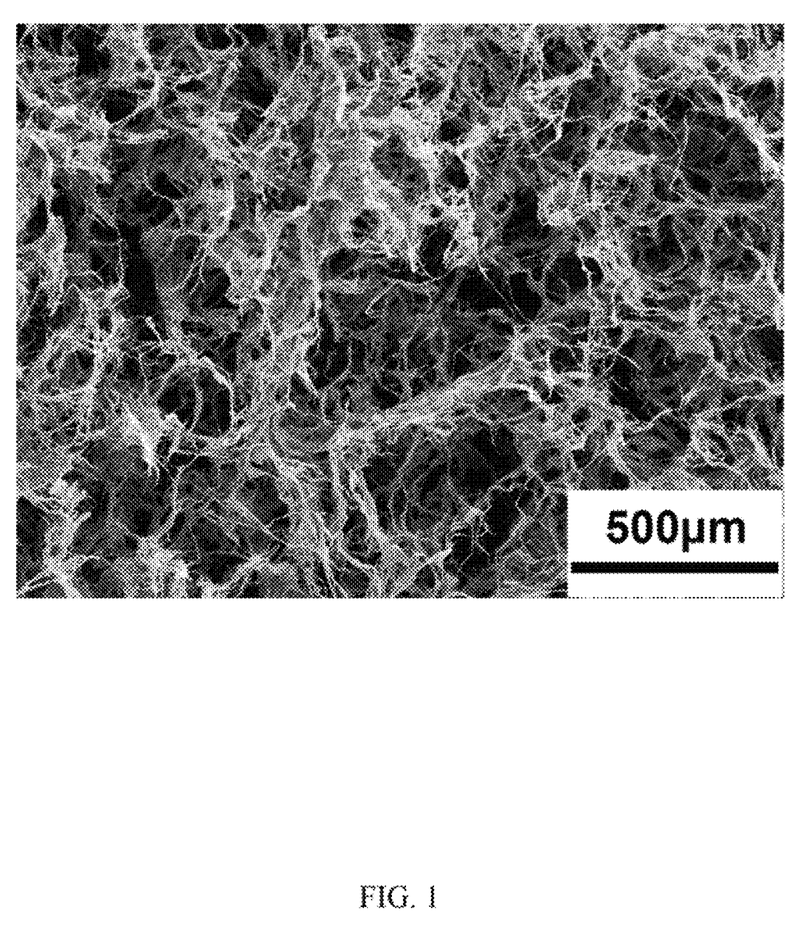
FIG. 1 is a Scanning Electron Microscope (SEM) image of a lithium ion battery anode according to one embodiment.
Figure 2:
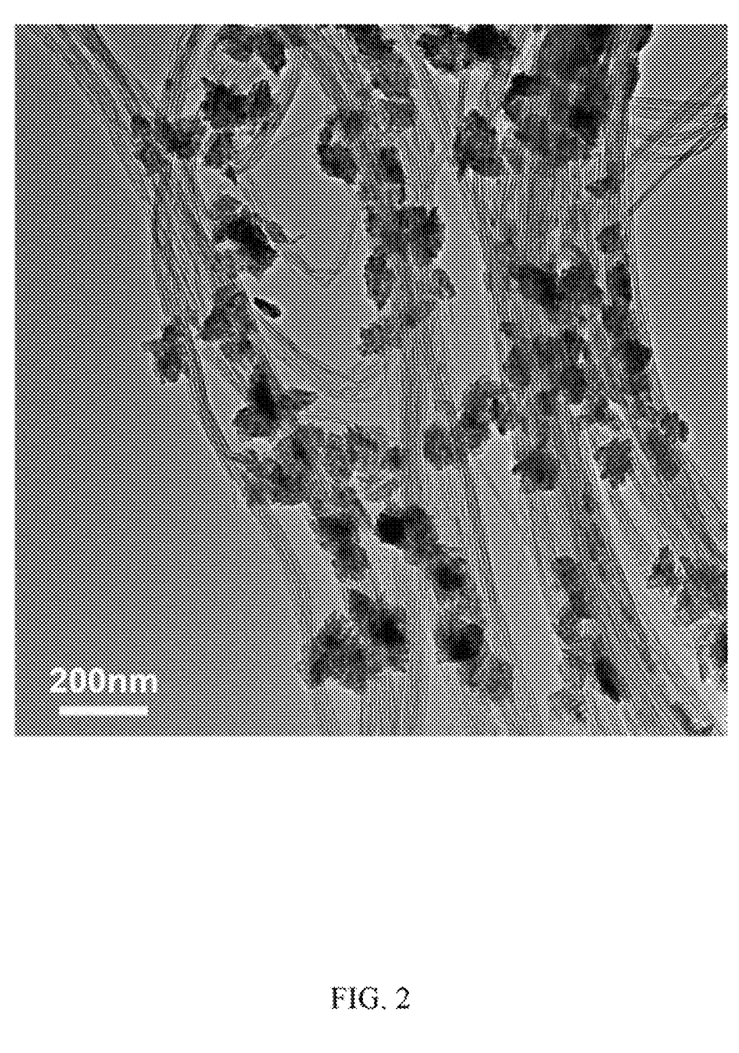
FIG. 2 is a transmission Electron Microscope (TEM) image of a lithium ion battery anode according to one embodiment.
Figure 3:
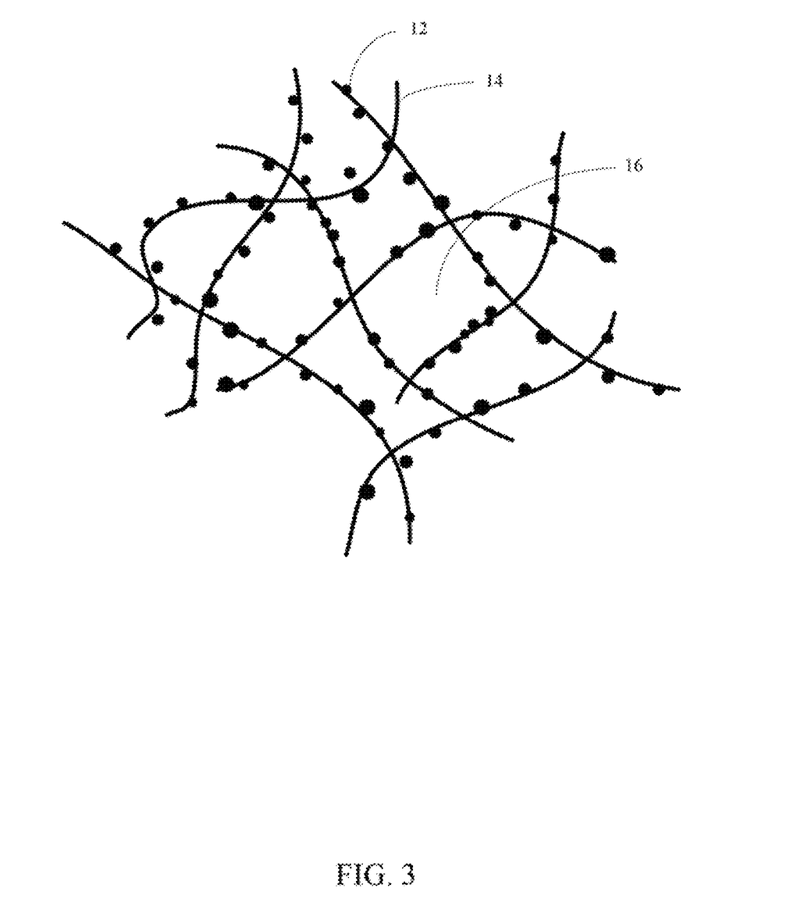
FIG. 3 is an enlarged schematic view of part of the lithium ion battery anode according to one embodiment.
Figure 4:
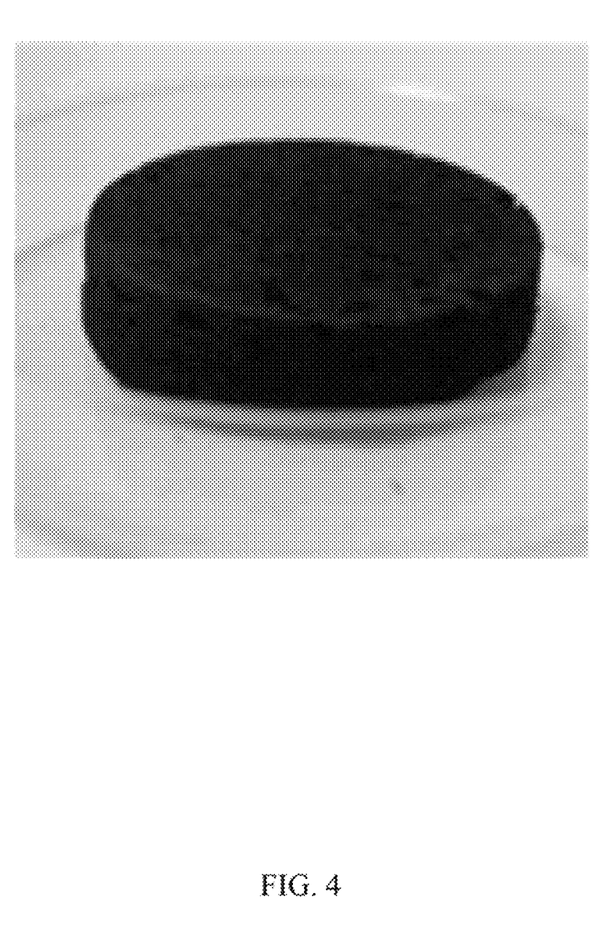
FIG. 4 is photo of a carbon nanotube sponge of one embodiment.

Referring to FIGS. 1-2, a lithium ion battery anode according to one embodiment is provided. The lithium ion battery anode includes a carbon nanotube sponge and a plurality of transition metal oxide particles. The carbon nanotube sponge is a 3D structure. Referring to FIG. 3, the carbon nanotube sponge is a honeycomb structure including a plurality of carbon nanotubes joined with each other by van der Waals attractive force. The carbon nanotube sponge includes a plurality of holes having sizes greater than or equal to 5 microns. Each of the plurality of holes is formed by adjacent carbon nanotubes. A plurality of transition metal oxide particles are attached uniformly to surfaces of the plurality of carbon nanotubes and located in the holes. That is, the mass of transition metal oxide particles per unit volume of carbon nanotube sponge is almost the same. The sizes of the plurality of transition metal oxide particles may vary. In one embodiment, the diameter of the largest particle is less than or equal to 200 nanometers. In another embodiment, the diameter of the largest transition metal oxide particles is less than or equal to 50 nanometers. Since the sizes of the holes in the carbon nanotube sponge are larger than sizes of the transition metal oxide particles, the lithium ion battery anode includes a plurality of pores formed by the holes in the carbon nanotube sponge and the transition metal oxide particles. Each of the plurality of pores is formed by each of the plurality of holes and transition metal oxide particles inside the hole. Sizes of the pores are smaller than that of the holes. The carbon nanotube sponge is a self-standing structure which serves as a supporting framework for supporting the transition metal oxide particles. FIG. 4 explains the internal structure of the lithium ion battery anode in more detail, in the carbon nanotube sponge, the carbon nanotubes 14 are crossed and overlapped with each other. The holes 16 in the carbon nanotube sponge are formed by adjacent carbon nanotubes. The transition metal oxide particles 12 are uniformly adhered to the surface of the carbon nanotubes 14 and located in the holes 16. A thickness of the lithium ion battery anode is not limited and can be adjusted according to actual needs. In this embodiment, the thickness of the lithium ion battery anode ranges from 100 micrometers to 5 millimeters. The thickness of the lithium ion battery anode is substantially equal to the thickness of the carbon nanotube sponge.

The lithium ion battery anode comprises of carbon nanotubes and transition metal oxide particles. Since the sizes of the transition metal oxide particles is smaller than the hole size in the carbon nanotube sponge, the holes are not filled up by the transition metal oxide particles. Therefore, the lithium ion battery anode has a hollow honeycomb structure, which includes a large number of pores, as shown in FIGS. 1 and 2. In some embodiments, the lithium ion battery anode has a porosity rate greater than or equal to 80%, and a specific surface area greater than or equal to 150 m$^2$/g. In the lithium ion battery anode, the mass percentage of the carbon nanotubes is in a range from 40%-60%, and the mass percentage of the transition metal oxide particles is in a range from 40%-60%.

The carbon nanotube sponge includes the carbon nanotubes, and the carbon nanotubes are entangled with each other. Carbon nanotubes Sponge comprises of carbon nanotubes. The carbon nanotubes can be pure carbon nanotubes, that is, surfaces of the carbon nanotubes does not contain impurities such as amorphous carbon. Carbon nanotubes have no functional group attached thereon, such as hydroxyl, carboxyl and so on. The carbon nanotubes include single-walled carbon nanotubes, double-walled carbon nanotubes or multi-walled carbon nanotubes. Carbon nanotubes have diameters ranged from 1 nanometer to 200 nanometers. The holes in the carbon nanotube sponge are formed by the adjacent carbon nanotubes, and the hole sizes can be greater than or equal to 10 microns. In some embodiment, the hole sizes are greater than or equal to 20 microns.

A material of the transition metal oxide particles can be $MnO_2$, $NiO$, $Fe_2O_3$ or $Co_3O_4$. Sizes of the transition metal oxide particles can be less than or equal to 50 nanometers. As can be seen from FIG. 1 and FIG. 2, the transition metal oxide particles are adhered to the surface of the carbon nanotubes uniformly without no clustering.

Performances of the lithium ion battery anode (No. 1 anode) provided by the present disclosure and a lithium ion battery anode (No. 2 anode) commonly used in the prior art will be tested and compared as follows. A No. 1 battery including the No. 1 anode and a No. 2 battery including the No. 2 anode are both constructed with same opposite electrode and electrolyte. No. 1 anode is composed of $MnO_2$ particles and the carbon nanotubes sponge, wherein a mass percentage of $MnO_2$ particles is 50.82%; No. 2 anode is composed of $MnO_2$ particles, carbon black conductive agent and binder, wherein a weight ratio between them is 5:4:1, that is, a mass percentage of $MnO_2$ particles is 50%. In the No. 1 anode and the No. 2 anode, the mass percentage of the $MnO_2$ particles are almost equal.

Figure 5:
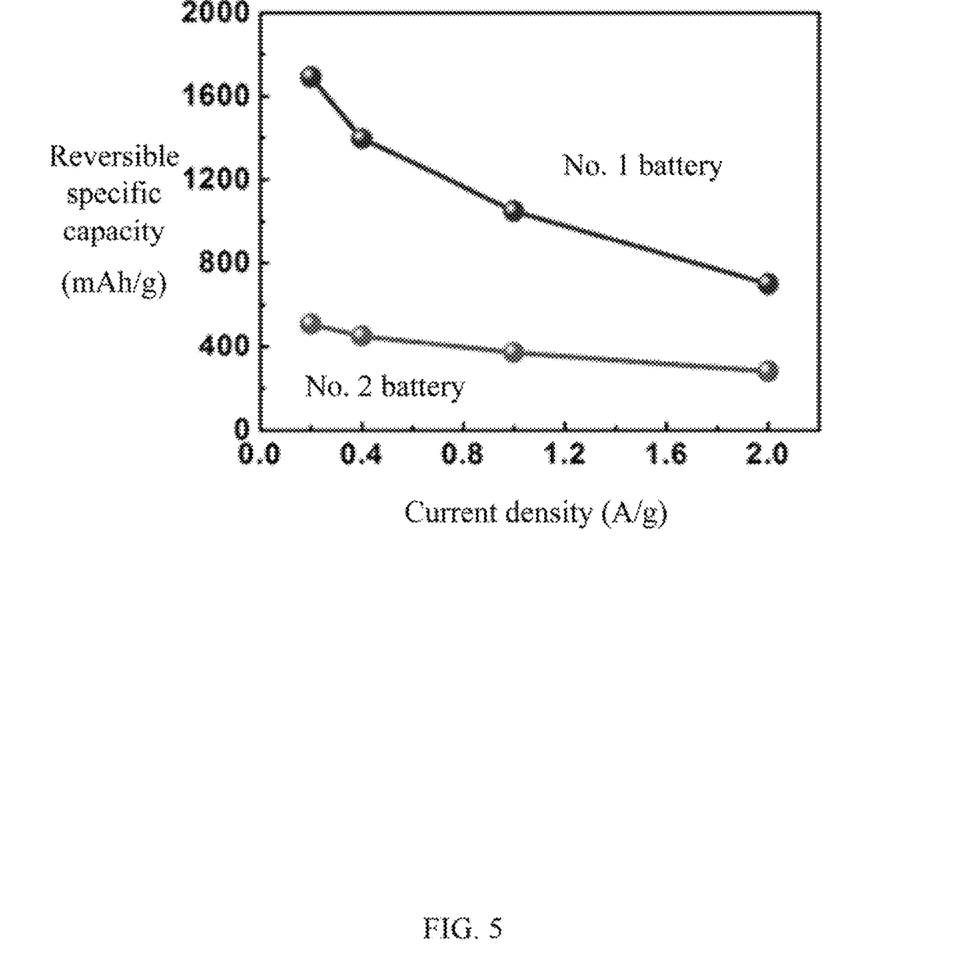
FIG. 5 is a comparison graph showing rate properties of a lithium ion battery using the lithium ion battery anode of the present disclosure against a traditional lithium ion battery.

Referring to FIG. 5, in a condition of with same initial discharge capacity, No. 1 anode shows reversible discharge capacities of 1691.8 mAh/g, 1395.4 mAh/g, 1050 mAh/g and 700 mAh/g corresponding to a current density of 0.2 A/g, 0.4 A/g, 1 A/g and 2 A/g; No. 2 anode shows reversible discharge capacities of 510 mAh/g, 451.8 mAh/g, 371.4 mAh/g and 280.2 mAh/g corresponding to a current density of 0.2 A/g, 0.4 A/g, 1 A/g and 2 A/g. It can be seen from that, compared with the conventional No. 2 anode, No. 1 anode has a better electrochemical performance.

Figure 6:
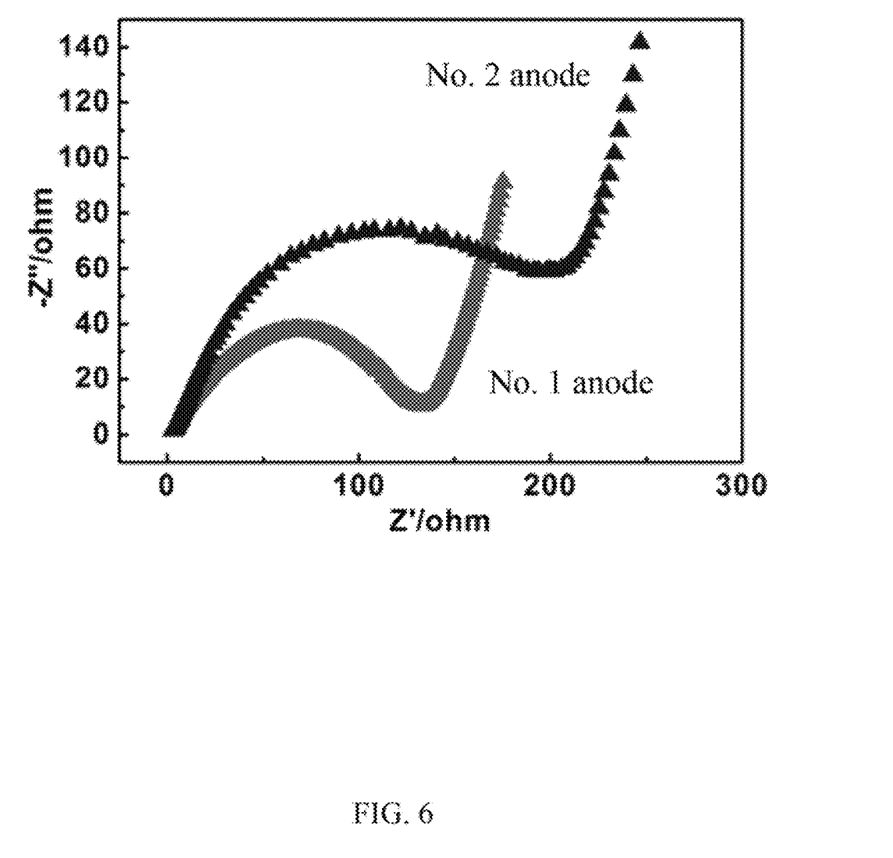
FIG. 6 is comparison graph showing electrochemical impedance values of a lithium ion battery using the lithium ion battery anode of the present disclosure and a traditional lithium ion battery.

Referring to FIG. 6, in the frequency range of 100 kHz to 100 mHz, electrochemical impedance spectra (EIS) graphs of the No. 1 anode and the No. 2 anode are obtained respectively. The EIS graphs show that a curve curvature corresponding to the No. 1 anode is smaller than that corresponding to the No. 2 anode. As such, the No. 1 anode has a lower charge transfer resistance than No. 2 anode, because in the No. 1 anode, the $MnO_2$ particles have a larger contact area with the electrolyte solution, and the No. 1 anode has a more effective conductive structure.

Figure 7:
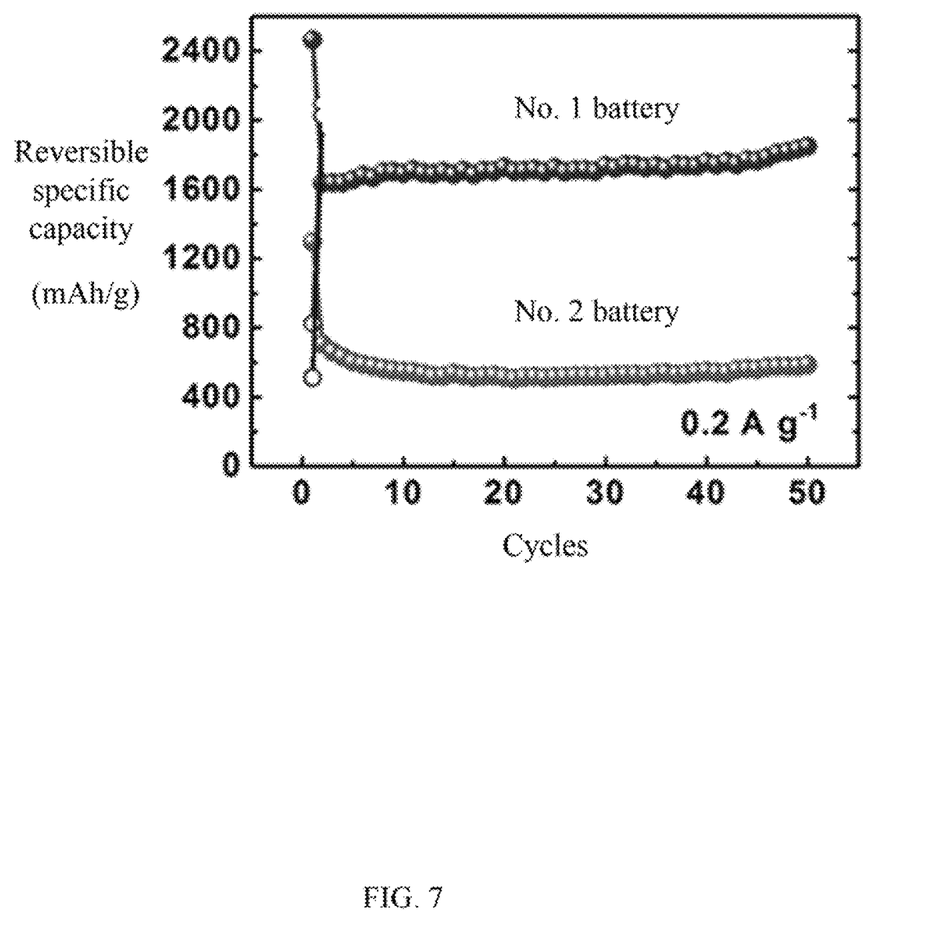
FIG. 7 is a comparison graph showing discharge cycling properties of a lithium ion battery using the lithium ion battery anode of the present disclosure against a traditional lithium ion battery.

Referring to FIG. 7, in a condition with same discharge current and initial discharge capacity, after 50 cycles, a reversible specific capacity of No. 1 battery is 1846.5 mAh/g, and a reversible specific capacity of No. 2 battery is only 585 mAh/g. It is clear that, a cycling performance of No. 1 battery is far better than that of No. 2 battery. As such, the lithium ion battery composed of the lithium ion battery anode provided by the present disclosure has a better cycle performance.

The lithium ion battery anode provided by the present disclosure has the following advantages. Firstly, the carbon nanotube sponge is a honeycomb structure having a plurality of holes, and the plurality of transition metal oxide particles are uniformly adhered on the surface of the carbon nanotubes and located in the holes. Sizes of the transition metal oxide particles are much smaller than sizes of the holes. As such, in the lithium ion battery charge and discharge process, the expansion of the transition metal oxide particles do not cause a volume lithium ion battery anode change, and a lithium ion battery using the lithium ion battery anode is not destroyed. Secondly, as the transition metal oxide particles are attached to the surface of the carbon nanotubes, the carbon nanotubes support the transition metal oxide particles are also used as the conductive agents of the lithium ion battery anode, which greatly improves the conductivity and reactivity of the lithium ion battery anode. Thirdly, lithium ion battery anode has a higher porosity and larger specific surface area, when the lithium ion battery anode is placed in the electrolyte, the transition metal oxide particles can be fully in contact with the electrolyte, a reaction area between the transition metal oxide particles and electrolysis is large, as such, the lithium ion battery has a better charge and discharge performance. Fourthly, the lithium ion battery anode provided by the present disclosure has no binder, and a specific gravity of the anode active material in the lithium ion battery anode is increased, and at the same time, because there is no insulating binder between the active materials, the conductivity of lithium ion battery anode will be correspondingly improved. In addition, since the binder is generally organic, which causes pollution to the environment, the lithium ion battery anode of the present disclosure requires no binder and is more environment friendly.

Figure 8:
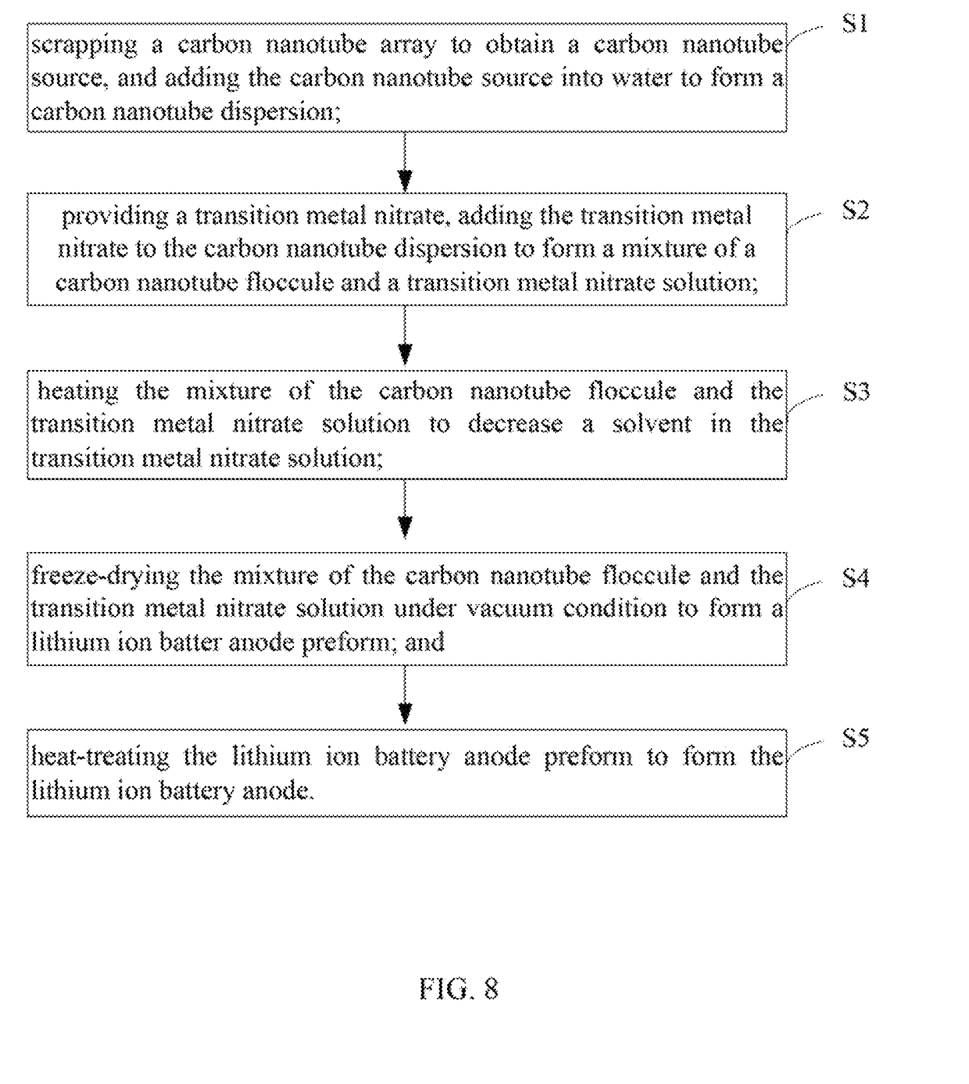
FIG. 8 is a flow chart showing a method for making the lithium ion battery anode according to one embodiment.

FIG. 8 illustrates one embodiment of a method for making the lithium ion battery anode, which includes the following steps:

S1: scrapping a carbon nanotube array to obtain a carbon nanotube source, and adding the carbon nanotube source into water to form a carbon nanotube dispersion;

S2: providing a transition metal nitrate, adding the transition metal nitrate to the carbon nanotube dispersion to form a mixture of a carbon nanotube floccule and a transition metal nitrate solution;

S3: heating the mixture of the carbon nanotube floccule and the transition metal nitrate solution to reduce the amount of solvent in the transition metal nitrate solution;

S4: freeze-drying the mixture of the carbon nanotube floccule and the transition metal nitrate solution under vacuum condition to form a lithium ion battery anode preform; and S5: heat-treating the lithium ion battery anode preform to form the lithium ion battery anode.

In step S1, the carbon nanotube source can consist of carbon nanotubes. The carbon nanotubes can be single-walled carbon nanotubes, double-walled carbon nanotubes, or multi-walled carbon nanotubes. A diameter of the carbon nanotube can be in a range from about 20 nanometers to about 30 nanometers. A length of the carbon nanotubes can be longer than 100 micrometers. In one embodiment, the length of the carbon nanotubes is longer than 300 micrometers. The carbon nanotubes can be pure, meaning there are few or no impurities adhered to the surface of the carbon nanotubes. A method for making the carbon nanotube source can include: providing a carbon nanotube array, wherein the carbon nanotube array can be formed on a substrate, and scratching off the carbon nanotube array from the substrate to form the carbon nanotube source. The carbon nanotube source obtained directly from the carbon nanotube array makes the carbon nanotube sponge stronger. In one embodiment, the carbon nanotube array is a super-aligned carbon nanotube array. In the super-aligned carbon nanotube array, a length of the carbon nanotubes is virtually uniform and is longer than 300 micrometers. Surfaces of the carbon nanotubes are clean and without impurities.

In step S2, the transition metal nitrate may be a transition metal nitrate powder or a transition metal nitrate solution. The transition metal nitrate can be manganese nitrate, iron nitrate, nickel nitrate or cobalt nitrate. The concentration of the transition metal nitrate solution or an amount of the transition metal nitrate powder is not limited, and can be adjusted according to the amount of the carbon nanotube source or the percentage of the transition metal oxide in the final product.

After the transition metal nitrate is added into the carbon nanotube dispersion, they may be agitated. After the agitation, the carbon nanotubes of the carbon nanotube source are uniformly distributed to form the carbon nanotube flocculent. The carbon nanotube flocculent is located in the transition metal nitrate solution. A volume of the carbon nanotube flocculent is smaller than a volume of the transition metal nitrate solution. Since the carbon nanotube source is scratched from the super-aligned carbon nanotube array, the process of ultrasonic agitation does not separate the carbon nanotubes, the carbon nanotubes of the carbon nanotube source maintain the flocculent structure, in which the carbon nanotubes are entangled with each other. In the carbon nanotube flocculent, the carbon nanotubes entangled with each other to form a porous structure, the shape of which is similar to that of cotton in the conventional textile industry.

The agitating method can be ultrasonic vibration or magnetic stirring. An agitating time ranges from 20 to 48 hours. If the Stirring time is too short, a flocculent structure of carbon nanotubes cannot be obtained. In the mixture of a carbon nanotube floccule and a transition metal nitrate solution, the carbon nanotube floccule is located in the transition metal nitrate solution and surrounded by the transition metal nitrate solution.

Step S3 is an optional step. The purpose of heating the mixture of the carbon nanotube floccule and the transition metal nitrate solution is to reduce the amount of solvent in the transition metal nitrate solution to adjust the density and volume of the carbon nanotube floccule. In this step, the solvent of the transition metal nitrate solution is reduced, the volume of the transition metal nitrate solution is reduced, the volume of the carbon nanotube floccule submerged in the transition metal nitrate solution is reduced, the density is increased. That is, a fluffy degree and density of the carbon nanotube floccule determine the density and volume of the carbon nanotubes in the final product. The heating temperature is in a range from 60 to 90° C.

In step S4, a process of freeze-drying the mixture of the carbon nanotube floccule and the transition metal nitrate solution includes steps of:

S41: placing the mixture of the carbon nanotube floccule and the transition metal nitrate solution into a freeze drier, and rapidly cooling the flocculent structure to a temperature lower than −40° C.; and S42: creating a vacuum in the freeze drier and increasing the temperature to a room temperature in gradual stages, a period of drying in different stages ranges from about 1 hour to about 10 hours.

The process of freeze-drying the mixture of the carbon nanotube floccule and the transition metal nitrate solution under a vacuum condition prevents the carbon nanotube sponge preform from collapsing, thus obtaining a fluffy carbon nanotube sponge. The lithium ion battery anode preform includes a carbon nanotube sponge freeform. A density of the carbon nanotube sponge preform ranges from about 0.5 mg/cm$^3$ to about 100 mg/cm$^3$. The density of the carbon nanotube sponge preform can be changed according to practice.

In step S5, the process of heat-treating the lithium ion battery anode preform includes: placing the lithium ion battery anode preform in a heating furnace, adjusting a target temperature of the heating furnace to 250° C. to 300° C. under a heating speed of 0.5° C. to 1.5° C. per minute, and maintaining the target temperature for 3 hours to 8 hours. After the heat-treating step, the transition metal nitrate solution in the lithium ion battery anode preform changes to transition metal oxide particles, the carbon nanotube sponge preform changes to the carbon nanotube sponge. The transition metal oxide particles adhere to the surface of the carbon nanotubes. Because, the transition metal nitrate solution uniformly covers the surface of the carbon nanotubes before the heat-treating step, the transition metal oxide particles are uniformly adhered on the surfaces of the carbon nanotubes without any agglomeration after the heat-treating step.

The method for making the lithium ion battery anode provided by the present disclosure is simple, low in cost. In the method, a fixed framework structure of the carbon nanotubes without adding a binder can be formed to support the transition metal oxide particles.

Figure 9:
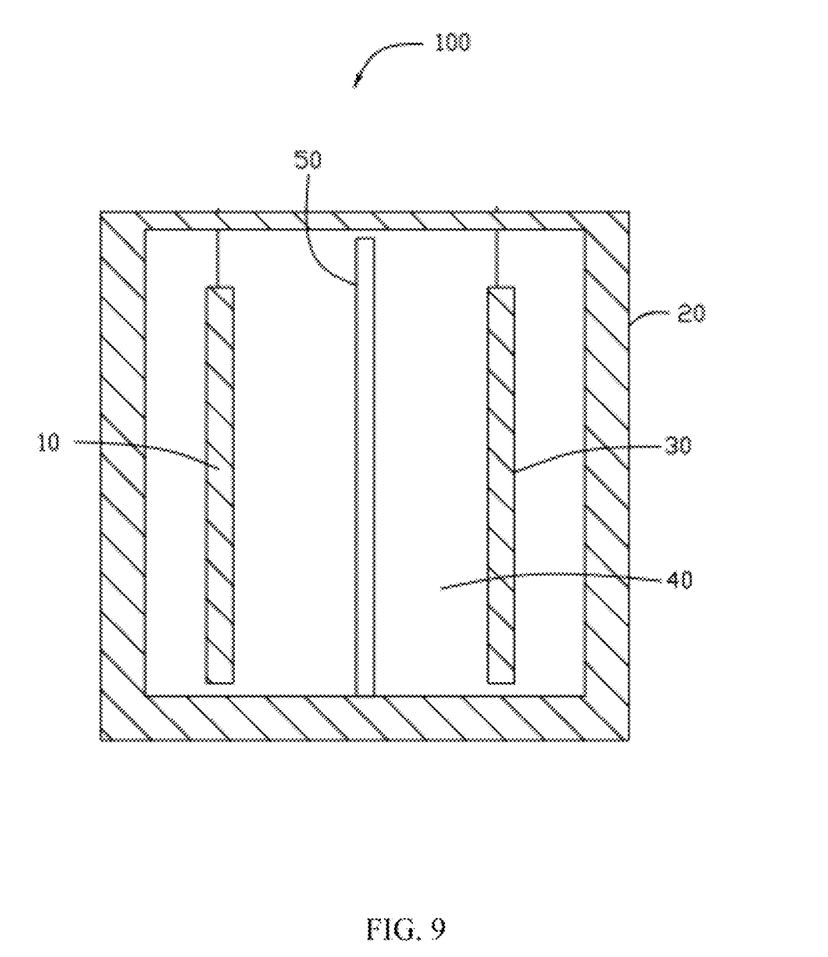
FIG. 9 is a side sectional view of a lithium ion battery according to one embodiment.

Referring to FIG. 9, the present disclosure further provides a lithium ion battery 100 using the lithium ion battery anode discussed above. The lithium ion battery 100 includes a shell 20, the lithium ion battery anode 10, a cathode 30, an electrolyte 40 and a separator 50. The lithium ion battery anode 10, the cathode 30, the electrolyte 40 and the separator 50 is located in the shell 20. The anode 10, the cathode 30, and the separator 50 of the lithium ion battery 100 are located in the electrolyte 40. The separator 50 is located between the anode 10 and the cathode 30. An internal space of the shell 20 is divided into two parts by the separator 50.

The lithium ion battery anode 10 is the lithium ion battery anode discussed above.

The lithium ion battery cathode 30 includes a cathode active material layer and a current collector. The cathode material layer 116 includes cathode active material, conductive agent and binder uniformly mixed with each other. The cathode active material can be lithium manganate, lithium cobaltate, lithium nickelate, or lithium iron phosphate. The current collector can be a metal plate, such as a platinum plate or the like.

The separator 50 can be a microporous polypropylene film. The electrolyte salt in the electrolyte can be lithium hexafluorophosphate, lithium tetrafluoroborate or lithium bis-oxalate borate. An organic solvent in the electrolyte can be ethylene carbonate, diethyl carbonate dimethyl carbonate or the like.

During charging process, a voltage applied to the anode 10 and cathode 30 makes the active material in the cathode 30 of the lithium ion battery to release lithium ions and electrons, and the lithium ions are embedded in the anode 10 to obtain an electron simultaneously; during discharging process, lithium ions and electrons are released from the anode 10, and the lithium ions are combined with the cathode active material in the cathode 30, and the cathode active material is given an electron. The lithium ion battery anode used in the present disclosure includes a carbon nanotube sponge with a 3D structure and a plurality of transition metal oxide particles. The lithium ion battery anode is a porous structure. When the lithium ion battery anode is located inside the electrolyte, the electrolyte penetrates into interior of the lithium ion battery anode and gets full contact with the transition metal oxide particles. Compared with a traditional graphite anode, a conversion reaction of the lithium ion battery provided by the present disclosure can be described by the following reaction:

Here, M represents a transition metal element, O represents an oxygen element, and x and y represent numerical values.

Due to the high porosity and the larger specific surface area of the lithium ion battery anode, when the lithium ion battery anode of the present disclosure is placed in the electrolyte, the transition metal oxide particles can sufficiently contact with the electrolyte to increase a reaction area between the transition metal oxide particles and the electrolyte, as such, the lithium ion battery has a better charge-discharge performance.

The structure of the lithium ion battery is not limited to the above structure. As long as the lithium ion battery uses the lithium ion battery anode disclosed in the present disclosure, the lithium ion battery is within the scope of the present disclosure.

Figure 10:
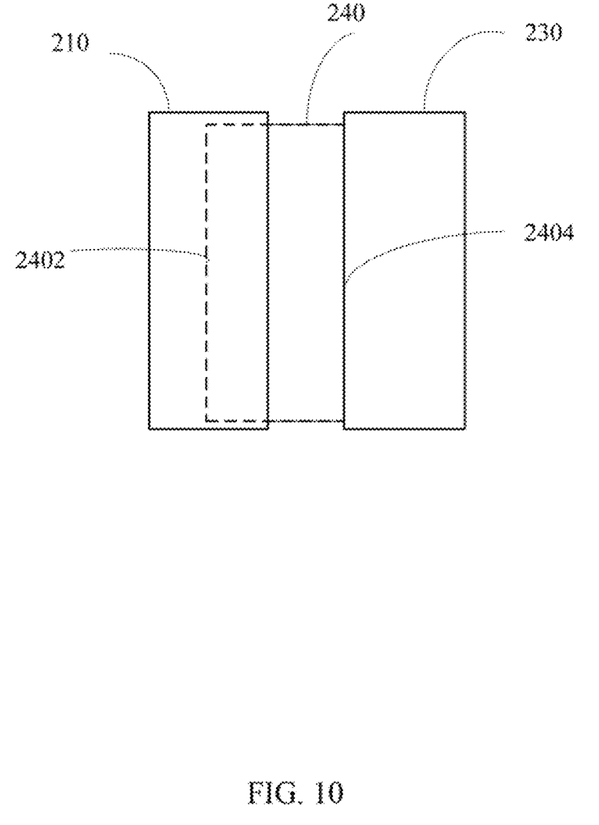
FIG. 10 is a side view of the lithium ion battery according to one embodiment.

Referring to FIG. 10, a lithium ion battery 200 using the lithium ion battery anode discussed above according to another embodiment is provided. The lithium ion battery 200 includes a shell, a lithium ion battery anode 210, a cathode 230 and an electrolyte film 240. The lithium ion battery anode 210, the cathode 230 and the electrolyte film 240 are located in the shell. The anode 210 and the cathode 230 are laminated and spaced from each other by the electrolyte film 240. The anode 210, the electrolyte film 240 and the cathode 230 are stacked one upon another to form a battery cell. When the lithium ion battery 200 includes a plurality of battery cells, the plurality of battery cells are stacked with each other. In this embodiment, the lithium ion battery 200 includes one battery cell. The lithium ion battery 200 can be a thin film lithium ion battery or an ordinary lithium ion battery.

The anode 210 is the lithium-ion battery anode including the carbon nanotube sponge and the transition metal oxide particles described above. A thickness of the anode 210 is not limited. In some embodiments, the thickness of the anode 210 is ranged from about 100 microns to about 300 microns. In one embodiment, the thickness of the anode 210 is 200 microns.

The cathode 230 includes a cathode active material layer and a current collector. The cathode material layer 116 includes cathode active material, conductive agent and binder uniformly mixed with each other. The cathode active material can be lithium manganate, lithium cobaltate, lithium nickelate, or lithium iron phosphate. The current collector can be a metal plate, such as a platinum plate or the like. A thickness of the cathode 230 is not limited. In some embodiments, the thickness of the cathode 230 is ranged from about 100 microns to about 300 microns. In one embodiment, the thickness of the cathode 230 is 200 microns.

The electrolyte film 240 should have the following characteristics: good stability at an operating voltage and an operating temperature compared with the electrode; good lithium ion conductivity ($\geq 10^{-8}$ S/cm), low conductivity of the electrons as small as possible. A material of the electrolyte membrane 240 can be a gel-like membrane formed of an inorganic solid electrolyte membrane, a polymer electrolyte membrane, or an ordinary electrolyte solution. A thickness of the electrolyte membrane 240 can be ranged from 100 micrometers to 1 millimeter. The electrolyte membrane 240 can be solid, semi-solid (such as gel or slurry). In this embodiment, the material of the electrolyte membrane is polyvinyl alcohol, which is a gel-like membrane.

Figure 11:
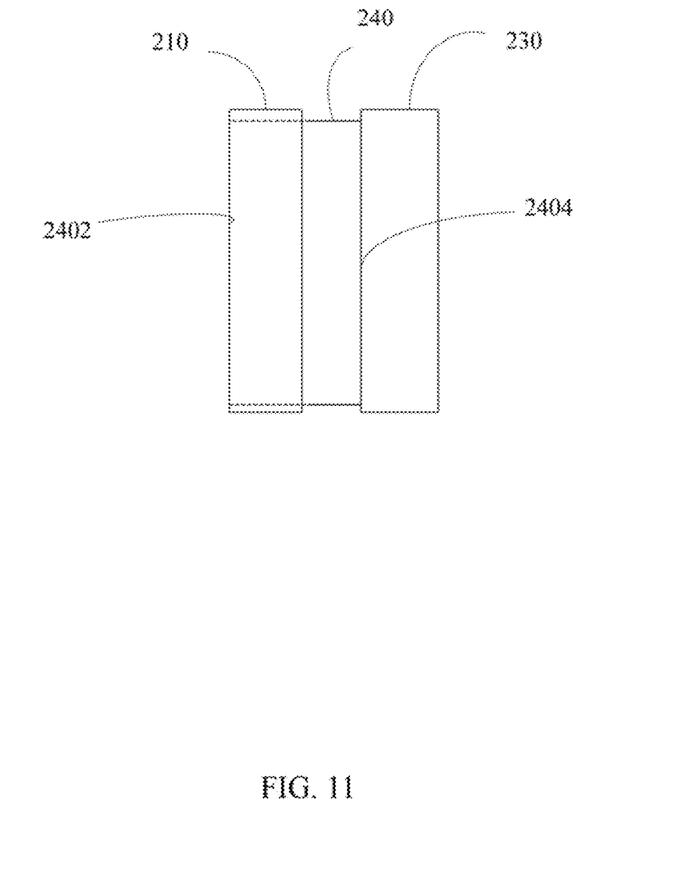
FIG. 11 is a side view of the lithium ion battery according to another embodiment.
Figure 12:
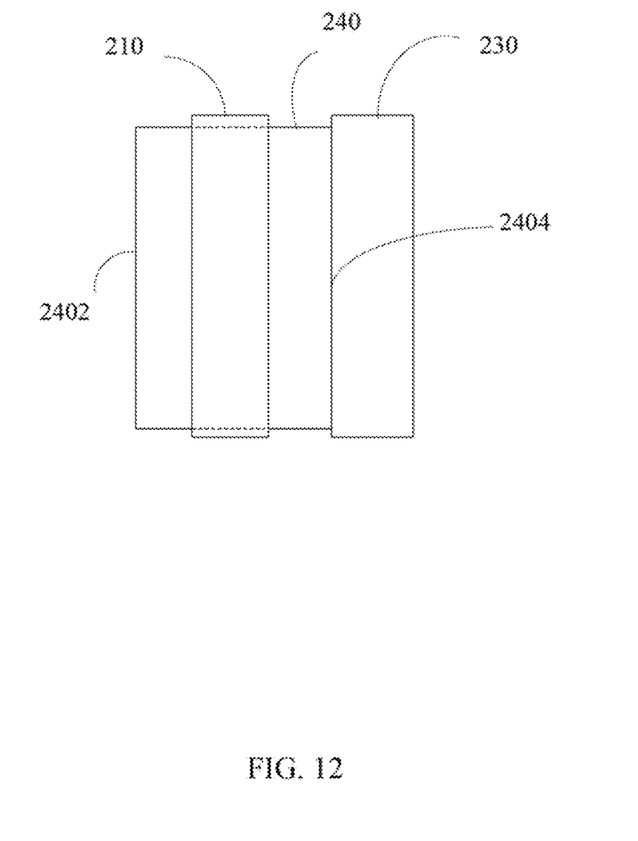
FIG. 12 is a side view of the lithium ion battery according to yet another embodiment.

The electrolyte film 240 defines a first surface 2402 and a second surface 2404. The first surface 2402 and the second surface 2404 are two opposite surfaces. The cathode 230 is disposed on the second surface 2404 of the electrolyte film 240, and the cathode material layer directly contacts the second surface 2404 of the electrolyte membrane 240. The anode 210 is adjacent to the first surface 2402 of the electrolyte film 240 and is spaced from the cathode 230 by at least a thickness of the electrolyte film 240. Since the anode 210 has a porous structure, part of the electrolyte film 240 is embedded in the anode 210 through the pores of the anode 210. The relative positions of the electrolyte film 240 and the anode 210 include the following cases: in one embodiment, please refer to FIG. 10, part of the electrolyte film 240 is embedded in the anode 210 and the first surface 2402 is located in the anode 210; in another embodiment, referring to FIG. 11, the whole electrolyte film 240 is embedded in the anode 210, the first surface 2402 and one surface of the anode 210 are overlapped with each other; in yet another embodiment, referring to FIG. 12, the anode 210 is located between the first surface 2402 and the second surface 2404.

The anode 210 includes carbon nanotube sponge and transition metal oxide particles and has a honeycomb porous structure. Therefore, a portion of the electrolyte film 240 can be embedded in the anode 210, the electrolyte material in the electrolyte film 240 and the transition metal oxide particles have sufficiently contact with each other, which increases the reaction surface area between the transition metal oxide particles and the electrolyte material, and, the lithium ion battery 200 has good performance.

It is to be understood that the above-described embodiments are intended to illustrate rather than limit the present disclosure. Variations may be made to the embodiments without departing from the spirit of the present disclosure as claimed. Elements associated with any of the above embodiments are envisioned to be associated with any other embodiments. The above-described embodiments illustrate the scope of the present disclosure but do not restrict the scope of the present disclosure.

Depending on the embodiment, certain of the steps of a method described may be removed, others may be added, and the sequence of steps may be altered. The description and the claims drawn to a method may include some indication in reference to certain steps. However, the indication used is only to be viewed for identification purposes and not as a suggestion as to an order for the steps.

What is claimed is:

1. A method for making lithium ion battery anode comprising:
   scrapping a carbon nanotube array to obtain a carbon nanotube source, and adding the carbon nanotube source into water to form a carbon nanotube dispersion;
   providing a transition metal nitrate, adding the transition metal nitrate to the carbon nanotube dispersion to form a mixture of a carbon nanotube floccule and a transition metal nitrate solution;
   freeze-drying the mixture of the carbon nanotube floccule and the transition metal nitrate solution under vacuum condition to form a lithium ion battery anode preform; and
   heat-treating the lithium ion battery anode preform to form the lithium ion battery anode, wherein the transition metal nitrate solution in the lithium ion battery anode preform is transformed to transition metal oxide particles.

2. The method of claim 1, wherein the carbon nanotube source consists of carbon nanotubes.

3. The method of claim 1, wherein before freeze-drying the mixture of the carbon nanotube floccule and the transition metal nitrate solution, a step of heating the mixture of the carbon nanotube floccule and the transition metal nitrate solution to decrease a solvent in the transition metal nitrate solution is further comprised.

4. The method of claim 3, wherein after the step of heating the mixture, a volume of the transition metal nitrate solution is reduced, a volume of the carbon nanotube floccule submerged in the transition metal nitrate solution is reduced, a density of the mixture is increased.

5. The method of claim 3, wherein a heating temperature is in a range from 60° C. to 90° C.

6. The method of claim 1, wherein a process of freeze-drying the mixture of the carbon nanotube floccule and the transition metal nitrate solution comprises steps of:
   placing the mixture of the carbon nanotube floccule and the transition metal nitrate solution into a freeze drier, and rapidly cooling the flocculent structure to a temperature lower than −40° C.; and
   creating a vacuum in the freeze drier and increasing the temperature to a room temperature in gradual stages, a period of drying in different stages ranges from about 1 hour to about 10 hours.

7. The method of claim 1, wherein a density of the lithium ion battery anode preform is in a range from about 0.5 mg/cm$^3$ to about 100 mg/cm$^3$.

8. The method of claim 1, wherein the step of heat-treating the lithium ion battery anode preform includes: placing the lithium ion battery anode preform in a heating furnace, adjusting a target temperature of the heating furnace to 250° C. to 300° C. under a heating speed of 0.5° C. to 1.5° C. per minute, and maintaining the target temperature for 3 hours to 8 hours.

9. The method of claim 1, wherein the carbon nanotube array is a super-aligned carbon nanotube array.

10. The method of claim 1, wherein the carbon nanotube source comprises a plurality of carbon nanotubes longer than 300 micrometers.

11. The method of claim 10, wherein the plurality of carbon nanotubes are pure.

12. The method of claim 1, wherein the mixture of the carbon nanotube floccule and the transition metal nitrate solution is formed by agitating the transition metal nitrate and the carbon nanotube dispersion.

13. The method of claim 12, wherein an agitating time is in a range from 20 to 48 hours.

14. The method of claim 12, wherein in the carbon nanotube flocculent, the carbon nanotubes entangled with each other to form a porous structure.

* * * * *